P. J. DOCKRAY, DEC'D.
M. J. DOCKRAY, ADMINISTRATRIX.
STOP MOTION FOR COMBERS AND THE LIKE.
APPLICATION FILED OCT. 23, 1916.

1,252,098.

Patented Jan. 1, 1918.
2 SHEETS—SHEET 2.

Witness
Chas. L. Griesbauer.

Inventor
Peter J. Dockray, dec'd
by Mary J. Dockray,
Administratrix,
By Royal E. Burnham,
Attorney

UNITED STATES PATENT OFFICE.

PETER J. DOCKRAY, DECEASED, LATE OF WOONSOCKET, RHODE ISLAND, BY MARY J. DOCKRAY, ADMINISTRATRIX, OF WOONSOCKET, RHODE ISLAND.

STOP-MOTION FOR COMBERS AND THE LIKE.

1,252,098.      Specification of Letters Patent.      Patented Jan. 1, 1918.

Original application filed September 5, 1914, Serial No. 860,401. Divided and this application filed October 23, 1916. Serial No. 127,297.

*To all whom it may concern:*

Be it known that PETER J. DOCKRAY, deceased, late a citizen of the United States, residing at Woonsocket, in the county of Providence and State of Rhode Island, invented certain new and useful Improvements in Stop-Motions for Combers and the like, of which the following is a specification, reference being had therein to the accompanying drawing.

This invention relates to stop-motion for use in association with combers and other fiber-treating machines, and it is an object of the invention to provide efficient and reliably-acting means, the functioning of which is dependent upon occurrence of certain conditions in the material passing through the machine, for stopping the machine.

More particularly, the invention pertains to means, operating upon the choking of the trumpet through which sliver is drawn from the sliver-pan and delivered by rolls to the sliver-table, to close an electric circuit that initiates operation of mechanism that operates to stop the machine with which the invention is associated, as shown by the application of said Peter J. Dockray, for stop-motion for combers and the like, filed September 5, 1914, Ser. No. 860,401, of which the present application is a division.

While it is not the intention to limit the adaptation of the invention to any particular machine for treating material while in substantially continuous movement, the invention, for purposes of explanation, is described herein as associated with a cotton-comber, in which the stop-motion should operate, among other times, when the material becomes choked in the trumpet or in the sliver-pan at or in the vicinity of the entrance to the trumpet.

When read in connection with the description herein, the details of construction and arrangement of parts contemplated by the invention will be apparent from the accompanying drawings, forming a part hereof, wherein an embodiment of the invention is disclosed, for purposes of illustration.

While the disclosures herein now are considered to exemplify a preferable embodiment of the invention, it is not the intention to be limited necessarily thereto in interpretation of the claims, as alterations within the limits of the claims can be made without departing from the nature and spirit of the invention.

Like reference-characters refer to corresponding parts in the views of the drawings, of which—

Figure 1:
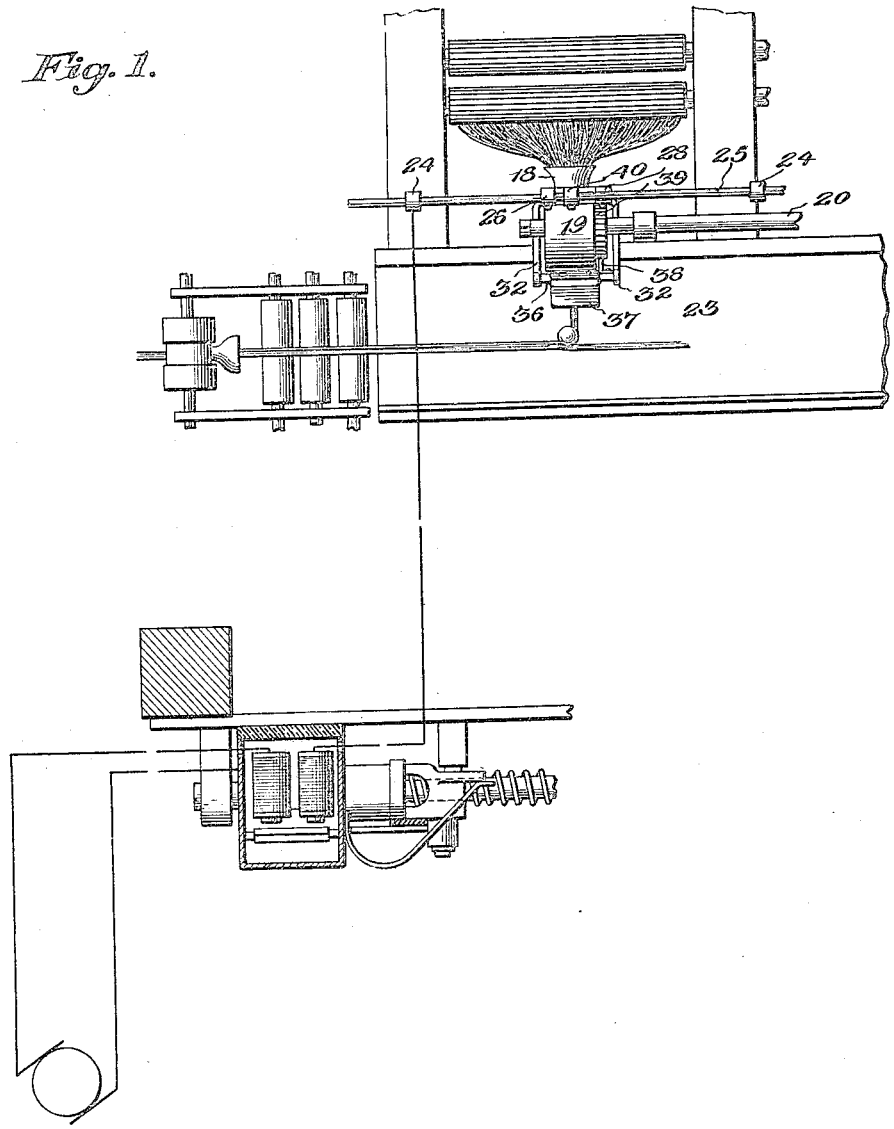
Figure 1 is a plan view of a portion of a comber.
Figure 2:
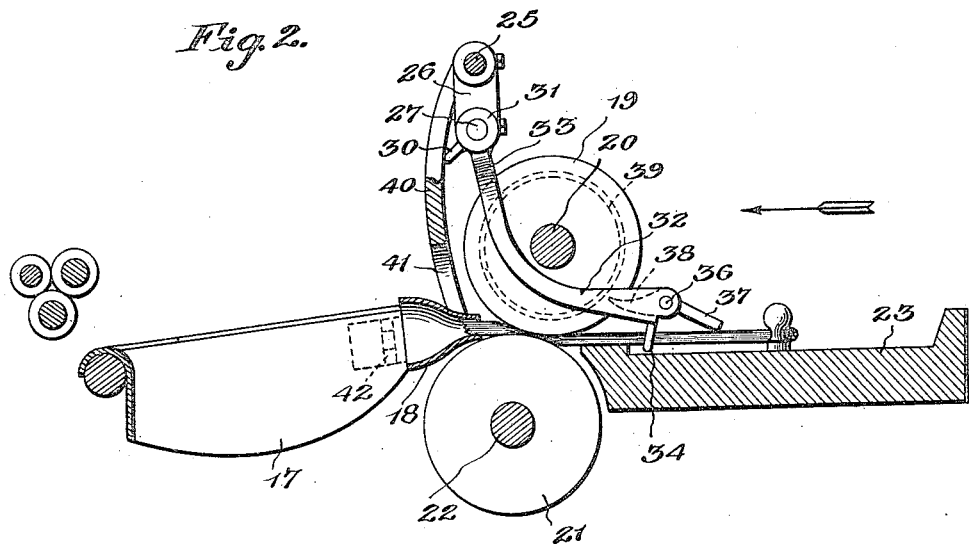
Fig. 2 is a sectional view through the sliver-pan, trumpet, and sliver-table.
Figure 3:
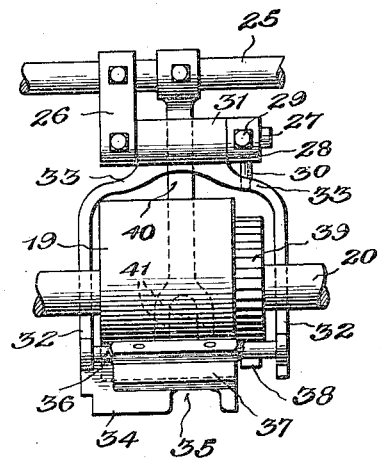
Fig. 3 is a view of parts as seen when looking in the direction of the arrow, Fig. 2.
Figure 4:
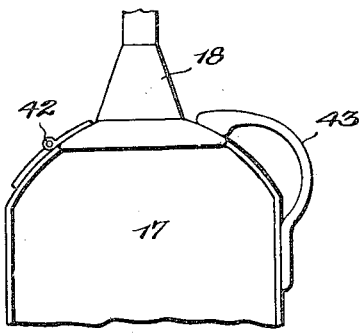
Fig. 4 is a plan view of a trumpet and a portion of its sliver-pan.

Referring more particularly to the drawings, in which parts of a comber as hereinbefore mentioned are disclosed, 17 designates a sliver-pan into which sliver is delivered from the combing mechanism of the machine and whence it is drawn as a round strand through a trumpet 18 by an upper calender-roll 19 on a shaft 20 and a lower calender-roll 21 on a shaft 22 and delivered onto a sliver-table 23, one set of such parts being shown as exemplary of others in the machine.

Extending along the sliver-table and supported on and insulated from the machine-frame are a series of standards 24, which carry at their upper ends a rod 25 extending longitudinally of the table above the sets of calender-rolls. Fast on the rod above each set of calender-rolls is a hanger or depending support 26, from the lower portion of which laterally extends a counter-rod 27 having disposition substantially parallel to the rod 25. An abutment 28 is held adjustably on the counter-rod near its free end by a set-screw 29, and depending from the abutment is a stop 30. The abutment holds on the counter-rod a boxing 31, which is a part of a swing-frame that comprises side arms 32, which flare outwardly from the boxing, as shown at 33, and then continue in parallel relation to each other to their free ends. One of the flaring portions 33 of the frame is capable of contact with the stop 30, whereby downward movement of the free ends of the arms is limited and contact of any part of the swing-frame with the sliver-table is prevented. The side arms are a sufficient distance apart to enable them to straddle or to be disposed one slightly beyond each end of the top calender-roll, and they are so curved that they extend from behind and under the shaft of that roll with their free ends above the sliver-table beyond the place of emergence of sliver from between the two rolls. One of the side arms near its free end has secured thereto or formed integrally therewith a depending plate 34, which extends partially across the space between the two arms and fully across the path of movement of the sliver from between the rolls. The plate is cut away from its lower edge, whereby there is formed an opening or passageway 35 for movement therethrough under normal conditions of sliver from the rolls to the table. A rock-shaft or its equivalent 36 is mounted pivotally near the ends of the arms and outside of and adjacent to the plate 34, and from this shaft depends a sliver-contact plate or member 37 of non-conductive material arranged to trail on the moving sliver. A pawl 38 also extends from the rock-shaft in such direction that it is capable of engagement with a ratchet-wheel 39 loose on the shaft 20 of the upper calender-roll and adjacent to an end of that roll. The relative disposition of the parts is such that, when the plate 37 has sliver thereunder, the pawl is kept out of engagement with the ratchet-wheel, and that, on running out of the sliver and a consequent assumption of a lower position by the plate, the pawl will engage the ratchet-wheel, close an electric circuit, and stop the machine in a manner hereinafter described. Moreover, when the sliver breaks beyond the calender-rolls, or when it stops being drawn for any reason beyond the delivery side of the rolls while the machine is in operation, sliver will accumulate between the rolls and the plate 34 and by pushing against the plate as it is delivered from the rolls it will operate to raise the swing-arms to contact with the upper calender-roll shaft 20 and thereby close the electric circuit; or such lifting of the free end of the swing-frame may be such as to permit the plate 37 to swing sufficiently to bring the pawl 38 into engagement with the ratchet-wheel 39 and close the circuit. It is immaterial whether the circuit is closed by either or both of these methods.

The upper end of a member 40 is secured to the rod 25 above the counter-rod 27, and at its lower end it is bifurcated or formed with limbs 41, which straddle the trumpet 18 but normally do not contact therewith. At one side the trumpet is secured to the discharge end of the sliver-pan 17 by a hinge 42 so that it may have lateral swinging movement to bring it into contact with one of the limbs of the fork member 40, whereby an electric circuit is closed and the stop-motion caused to stop the machine. The trumpet is kept normally out of contact with a fork-limb by a spring 43 secured to the side of the sliver-pan opposite to the hinge and having its free end resting against the flaring or receiving end of the trumpet that abuts the end of the pan. The spring is sufficiently strong to overcome the drag of the sliver in emerging from the trumpet under normal conditions, but, when the trumpet becomes choked and resistance to the movement of the sliver thereby is increased, the calender-rolls by drawing on the sliver will cause the trumpet to swing laterally the slight distance necessary for its contact with a limb of the fork member, with the result just noted.

The circuit-closer herein described is adapted for use with any suitable mechanism, whose action is controlled or initiated by an electric circuit, arranged to stop the machine with which the circuit-closer is associated when the latter acts on occurrence of certain conditions in the material being treated as hereinbefore described.

As an example of the manner in which the circuit-closer may be employed, it is disclosed by Fig. 1 in association with an electric circuit shown diagrammatically in connection with a fragmentary view of a power-shifting mechanism of the kind shown in detail by the hereinbefore-mentioned prior application Ser. No. 860,401. In this arrangement, one wire of the circuit is connected to the insulated rod 25, in electrical connection with which rod are the sliver-controlled circuit-closers hereinbefore described, among which is the hinged trumpet, and the other wire of the circuit is grounded in the machine. When the trumpet operates as heretofore described, the circuit is closed through the machine and the insulated rod 25, and the action of the power-shifting mechanism thereby is instituted.

Having thus described the invention what is claimed as new, and desired to be secured by Letters Patent, is—

1. In a fiber-treating machine, the combination of a sliver-pan, a trumpet hingedly mounted thereon, a spring restraining said trumpet from swinging movement, a support mounted on the machine above said trumpet, an arm mounted on said support and having a bifurcated end straddling said trumpet and susceptive of contact thereby upon movement thereof from normal position, an electric circuit having said trumpet and arm as terminals, and a power-shifting device controlled by said circuit.

2. In a fiber-treating machine, a stop-motion comprising the combination, with a roll affecting movement of the material and a shaft upon which the roll is mounted, of a sliver-pan, a trumpet hingedly mounted thereon and arranged to deliver material to said roll at one side, a spring restraining said trumpet from swinging movement, a rod mounted on the machine above said trumpet, an arm on said rod extending to a place adjacent to said trumpet and susceptive of contact thereby upon movement thereof from normal position, a pivotally-mounted arm, a member thereon adjacent to the path of movement of material moving from said roll and arranged to trail on the material, an electric circuit having as terminals said trumpet, said arm with which the trumpet is contactable and a part of said trailing member, and a power-shifting device controlled by said circuit.

3. In a fiber-treating machine, the combination of a sliver-pan, a trumpet hingedly mounted thereon, a spring restraining said trumpet from swinging movement, a fixed terminal at the side of said trumpet and susceptive of contact therewith upon movement thereof from normal position, an electric circuit having said trumpet as one pole and said terminal as another pole, and a power-shifting device controlled by said circuit.

4. In a fiber-treating machine, the combination of a sliver-pan, a trumpet hingedly mounted thereon at one side, a spring on said pan contacting and restraining said trumpet from swinging movement, a fixed terminal at the side of said trumpet and susceptive of contact thereby upon movement thereof from normal position, an electric circuit having said trumpet as one pole and said terminal as another pole, and a power-shifting device controlled by said circuit.

5. In a fiber-treating machine, the combination of a sliver-pan, a trumpet hingedly mounted thereon, a spring restraining said trumpet from swinging movement, a rod mounted on the machine above said trumpet, an arm on said rod extending to a place adjacent to the side of said trumpet and susceptive of contact thereby upon movement thereof from normal position, an electric circuit having said trumpet and arm as terminals, and a power-shifting device controlled by said circuit.

6. In a fiber-treating machine, the combination of a sliver-pan, a trumpet, a hinge at one side of said trumpet connecting it to said sliver-pan, means whereby swinging movement of said trumpet is restrained, a fixed terminal adjacent to said trumpet at the same side as the hinge and susceptive of contact by the trumpet upon movement thereof from normal position, an electric circuit having said trumpet as one pole and said terminal as another pole, and a power-shifting device controlled by said circuit.

7. In a fiber-treating machine, the combination of a trumpet, a suitably mounted hinge secured to said trumpet at the side, means whereby swinging movement of said trumpet is restrained, a fixed terminal adjacent to said trumpet at the same side as the hinge and susceptive of contact by the trumpet upon movement thereof from normal position, an electric circuit having said trumpet and terminal as poles, and a power-shifting device controlled by said circuit.

MARY J. DOCKRAY,

*Administratrix of the estate of said Peter J. Dockray, deceased.*

Copies of this patent may be obtained for five cents each, by addressing the "Commissioner of Patents, Washington, D. C."